(12) United States Patent
Finn

(10) Patent No.: US 7,512,555 B2
(45) Date of Patent: Mar. 31, 2009

(54) INVESTMENT MANAGEMENT TOOL

(76) Inventor: Gregory M Finn, 214 Eton Rd., Pittsburgh, PA (US) 15205

(\*) Notice: Subject to any disclaimer, the term of this patent is extended or adjusted under 35 U.S.C. 154(b) by 1440 days.

(21) Appl. No.: 10/292,079

(22) Filed: Nov. 12, 2002

(65) Prior Publication Data

US 2003/0093348 A1 May 15, 2003

Related U.S. Application Data

(60) Provisional application No. 60/338,301, filed on Nov. 13, 2001.

(51) Int. Cl.
 *G06Q 99/00* (2006.01)
(52) U.S. Cl. .................. 705/35; 705/36 R; 705/39; 705/38; 705/40
(58) Field of Classification Search .............. 705/37, 705/1, 38, 39, 36 R
See application file for complete search history.

(56) References Cited

U.S. PATENT DOCUMENTS

| | | | |
|---|---|---|---|
| 3,573,747 A | 4/1971 | Adams et al. | |
| 5,126,936 A | 6/1992 | Champion et al. | |
| 5,758,097 A | 5/1998 | Debe et al. | |
| 5,784,696 A | 7/1998 | Melnikoff | |
| 5,794,219 A | 8/1998 | Brown | |
| 5,799,287 A | 8/1998 | Dembo | |
| 5,806,047 A | 9/1998 | Hackel et al. | |
| 5,806,049 A | 9/1998 | Petruzzi | |
| 5,812,987 A | 9/1998 | Luskin et al. | |
| 5,852,811 A | 12/1998 | Atkins | |
| 5,884,285 A | 3/1999 | Atkins | |
| 5,911,135 A | 6/1999 | Atkins | |
| 5,911,136 A | 6/1999 | Atkins | |
| 5,918,218 A | 6/1999 | Harris et al. | |
| 5,930,774 A | 7/1999 | Chennault | |
| 5,946,666 A | 8/1999 | Nevo et al. | |
| 5,987,435 A | 11/1999 | Weiss et al. | |
| 6,029,148 A | 2/2000 | Zurstrassen | |
| 6,601,044 B1* | 7/2003 | Wallman | 705/36 R |
| 6,868,525 B1* | 3/2005 | Szabo | 715/738 |
| 6,934,696 B1* | 8/2005 | Williams et al. | 706/47 |
| 6,957,191 B1* | 10/2005 | Belcsak et al. | 705/38 |
| 7,117,259 B1* | 10/2006 | Rohwer | 709/223 |
| 7,181,438 B1* | 2/2007 | Szabo | 707/2 |
| 7,316,000 B2* | 1/2008 | Poole et al. | 717/104 |
| 2002/0007334 A1* | 1/2002 | Dicks et al. | 705/37 |
| 2002/0147729 A1* | 10/2002 | Balfour | 707/104.1 |
| 2003/0041001 A1* | 2/2003 | Hoffman et al. | 705/37 |
| 2003/0078679 A1* | 4/2003 | Sutton | 700/17 |
| 2003/0093352 A1* | 5/2003 | Muralidhar et al. | 705/36 |
| 2007/0083455 A1* | 4/2007 | Bove et al. | 705/36 T |

OTHER PUBLICATIONS

Etrade, leading on-line brokerage firm, unveils powerful internet securities trading system, Feb. 12, 1996, PR Newswire, p. 0212NYM004.*

* cited by examiner

*Primary Examiner*—James P Trammell
*Assistant Examiner*—Behrang Badii

(57) ABSTRACT

An investment portfolio development and management system using dynamically linked and re-configurable portfolio building blocks for the construction and management of hierarchical portfolios. These building blocks are graphical structural elements of an investment portfolio that represent either individual investments or the hierarchical groupings of individual investments in a multi-tiered investment structure. The portfolio building blocks provide access to a variety of identity/position specific investment tools and they can be individually programmed and dynamically linked to enable two-way information flow both up and down the hierarchical structure to facilitate structured portfolio management functionality and information transfer consistent with the portfolio's structural design.

20 Claims, 8 Drawing Sheets

INVESTMENT MANAGEMENT TOOL

RELATED APPLICATION

The present application claims priority to provisional application No. 60/338,301, filed on Nov. 13, 2001, and entitled "Investment Management Tool." The present application is also related to U.S. patent application Ser. No. 09/547,409, filed on Apr. 12, 2000 and entitled "Investment System and Method," the contents of which are hereby incorporated by reference into the present application.

BACKGROUND OF THE PRESENT INVENTION

1. Field of the Invention

The present invention relates to investment portfolio management tools, and more particularly, to an improved investment portfolio management tool that enable investors to build and manage a customized portfolio of investments.

2. Background Art

For years, investors have been familiar with the convenience of diversifying investment monies through mutual funds. Only recently, however, have the Internet and related investment tools available to consumers made possible dramatic changes in investment methods open to the general public.

One investment technique, which has been enabled by the Internet, is Internet-based stock trading that bypasses individual brokers and therefore saves on transaction fees imposed on the investor. Low cost stock trading and the surge in the stock market over recent years have brought many new investors into the market. However, stock market investing can be risky and expensive. Moreover, it generally causes a great deal of stress with investors as they work their way through the many decision generating factors associated with stock purchases.

Even with the popularity and growth of online stock brokerage firms, many investors still enjoy the convenience, diversification and professional management associated with mutual funds. Mutual funds can offer varying degrees of diversification, sector focus and convenient methods to slowly and methodically build a substantial investment portfolio.

Historically, however, individual stock purchase or mutual fund purchases have been the two options for long-term equity investors. Hybrid account systems that allow customized fund creation have only recently come about with the evolution of the Internet. These systems provide an individual investor with the infrastructure to essentially construct a diversified portfolio of individual equities in a customized fashion while also providing very convenient means for slowly and methodically building the portfolio.

While these custom fund investment solutions offer useful investment options for the general public they seriously lack useful portfolio building and management tools.

U.S. patent application Ser. No. 09/547,409, filed on Apr. 12, 2000, and entitled "Investment System and Method," discloses an investment vehicle that enables investors to selectively buy and sell interests in fractionalized market units of individual securities. In one embodiment, investors can organize their holdings into one or more groups defined, for example, by security type (e.g., domestic or international stocks or bonds, small-, mid- or large-capitalization stocks, value equities, growth equities, etc.), by related industry sector (pharmaceutical, electronics, telecommunications, automotive, etc.), or by investment motive (e.g., preferred tax treatment, retirement, college fund, etc.), and each of the groups can preferably have a single-tiered or multi-tiered structure.

To facilitate the purchasing of interests in securities for an account having the aforementioned group structures, an investor can specify an "allocation factor" for each security, for each group, and for each sub-group included in an account. The allocation factor for a group specifies a percentage of a total amount to be used to purchase interests in securities for the account in which the group is located, and the allocation factor for a sub-group specifies a percentage of a total amount to be used to purchase interests in securities for the group in which the sub-group is located. The allocation factor for a particular security specifies a percentage of a total amount to be to be used to purchase interests in securities for the group (or sub-group as the case may be) in which the security is located, or if the security is not in a group or sub-group, a percentage of the total amount to be used to purchase interests in securities for the account in which the security is located. Having established these allocation factors, the investor can transmit an order that simply specifies a total amount to be used for purchasing interests in securities for the entire account and the investment vehicle will automatically purchase or otherwise obtain interests in the appropriate securities in accordance with the relevant allocation factors.

In order to further facilitate the development and maintenance of the account, the investor may also be provided with a visual representation of the account showing the hierarchical nature of the account structure. One such visual representation is shown in FIG. 1. As shown in FIG. 1, the account includes the groups designated "US Stocks" and "Foreign Stocks." The US Stocks group is multi-tiered and includes Small Cap, Mid Cap, and Large Cap sub-groups. The Small Cap sub-group includes stocks M-P, the Mid Cap sub-group includes stocks Q-S, and the Large Cap sub-group includes stocks T-W. The Foreign Stocks group is single-tiered and includes stocks X-Z. The investor can dynamically interact with the visual representation by means of a graphical user interface (GUI). By using such a GUI, the investor can easily build, reconfigure, and manage the investor's account(s) in a visually intuitive manner. In this regard, the GUI can provide the investor with dynamically re-configurable building blocks that, among other things: (1) can be used by the investor to build an investment portfolio structure of groups, sub-groups, and securities; (2) visually assist the investor with assigning allocation factors and achieving a desired asset allocation; (3) visually assist the investor in making portfolio changes; (4) visually assist the investor in making investments or sales; and (5) visually offer various types of portfolio information (including present stock prices, news items, and portfolio holdings, etc.).

While the foregoing GUI provides the investor with some degree of control over the creation and management of an account, a more robust investment portfolio management tool is desirable.

SUMMARY OF THE PRESENT INVENTION

It is the object of the present invention to provide an investment portfolio development and management tool to allow a plurality individual investors to visually and intuitively develop and manage customized, graphical, multi-tiered portfolios utilizing dynamically linked and re-configurable portfolio building blocks.

It is yet another object of the present invention to provide an investment management tool that provides visual portfolio building blocks that deliver flexible portfolio management whereby changes made to one dynamically linked and reconfigurable portfolio building blocks automatically reconfigures the portfolio, portfolio investment activities or information provided by the portfolio accordingly.

It is yet another object of the present invention to provide an investment management tool that allows an investor to retain portfolio infrastructure format while changing the constituents of the portfolio.

It is yet another object of the present invention to provide an investment management tool that provides a visual portfolio structure that offers the ability for the investor to switch between various expandable modes for full portfolio or more focused concentration of investment allocation, management functions or information resources.

It is yet another object of the present invention to provide an investment management tool that provides a visual portfolio structure that offers the ability for the investor to modify any portion of the portfolio structure for any specified full portfolio, subgroup, or single component investment activity.

It is still another object of the present invention to provide an investment management tool that provides a visual portfolio structure that offers the ability for the investor to make outside additions to the portfolio at any time and at any point in the structure within the bounds of the overall operational investment system.

It is still another object of the present invention to provide an intuitive portfolio development and management tool that provides allocation assistance indicators that may appear when developing or changing any relevant portion of the investment portfolio. Indicators could be graphical, numerical, audio or any combination of these.

It is yet another object of the present invention to provide an investment management tool that allows an investor to develop and save numerous visual component structures for investment allocation. Whereby the investor has the ability to establish different investment objectives and criteria for each of these visual component structures.

It is still another object of the present invention to provide an intuitive portfolio development and management tool that provides visual and audio alerts (Color codes, animation, sounds, etc.) on building blocks indicating investor pre-programmed alarm points and other various portfolio conditions. For example: equity/subgroup/portfolio up (green)/down (red); target price achieved; portfolio balancing suggested; news alert; etc.

BRIEF DESCRIPTION OF THE DRAWINGS

FIG. 2 depicts an Investor's blank portfolio construction screen.

FIG. 3 depicts the start of a portfolio's construction.

FIG. 4 depicts the selection of the main building block to name the portfolio.

FIG. 5 depicts the creation of a new subgroup on the second tier of the portfolio.

FIG. 6 depicts the creation of a new subgroup on the third tier of the portfolio underneath the already named "Technology" subgroup.

FIG. 7a categorizes the components of the four-tier structure according to the tier level on which the component resides. FIG. 7b categorizes the building blocks components as Group, Subgroup or Individual Portfolio Investment.

DETAILED DESCRIPTION OF THE INVENTION

The present invention provides a investment management tool (Investor or Client Based Portfolio Management System 200) that can be integrated with, used in conjunction with, and/or used in communication with an investment management system 300, to allow at least one individual Investor 101 to build and manage a customized portfolio. This is accomplished by providing visual portfolio construction and management functionality along with generally useful information directly and intuitively manageable from the visual construction of the portfolio.

Figure 9:
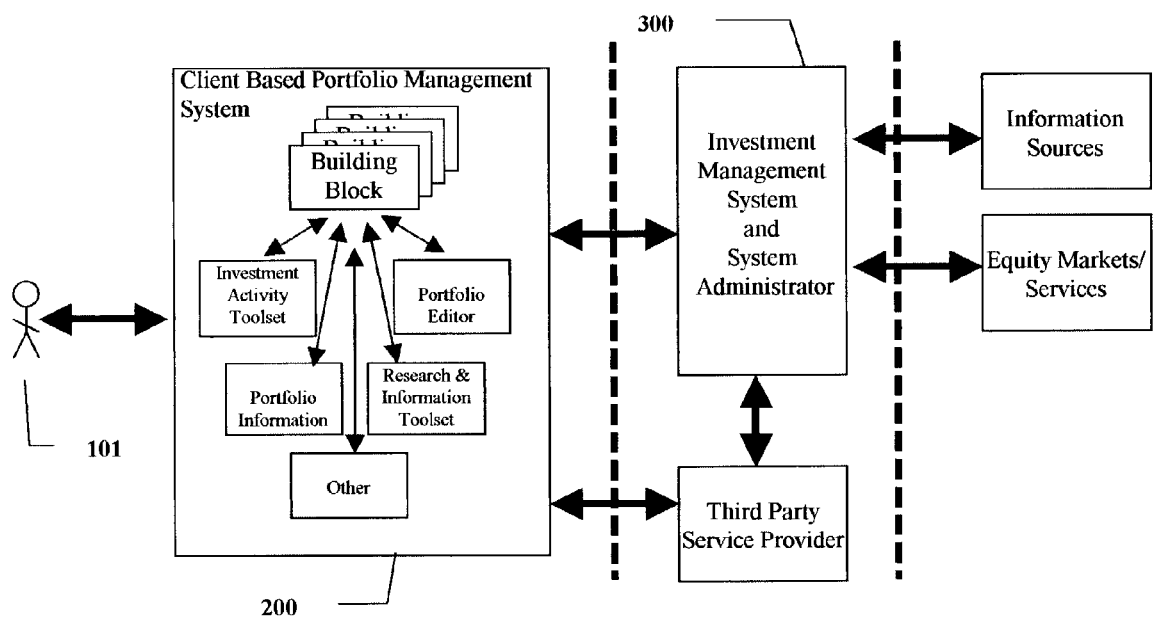
FIG. 9 illustrates some of the modes of operation and management tools available to the investor through the portfolio management tool along with some of the communication blocks that complete the overall investment service infrastructure.
Figure 10:
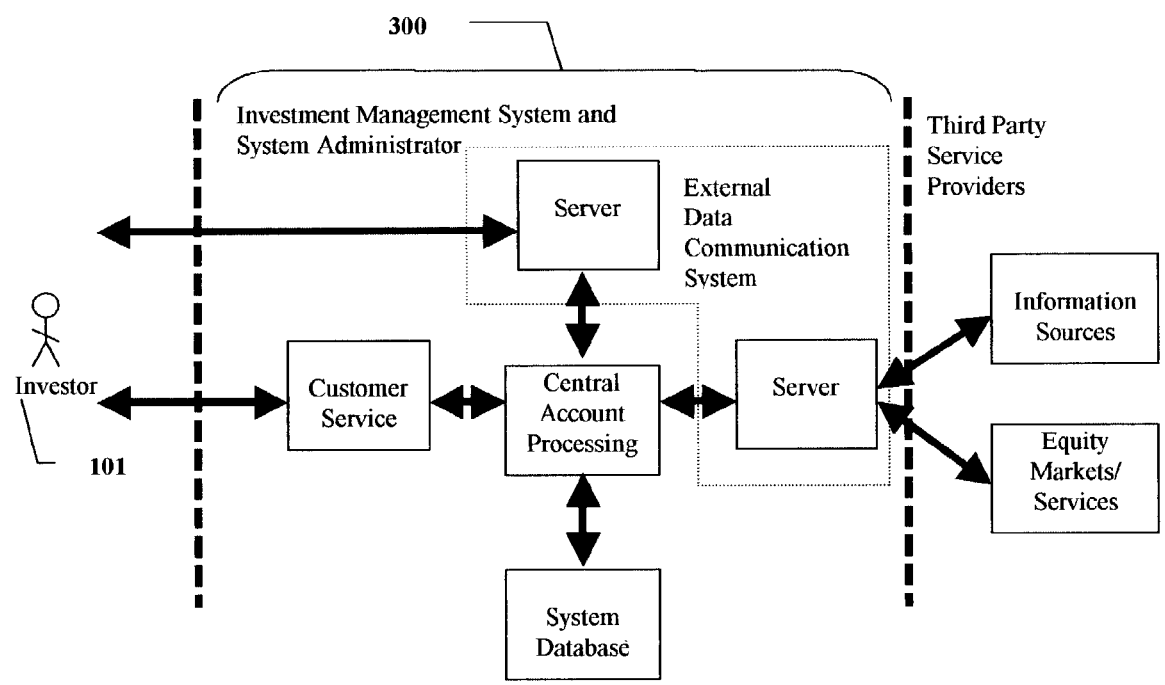
FIG. 10 illustrates some of the functional communication blocks that may be implemented within the Investment System.

The investment management system 300 is preferably implemented using a programmed computerized data processing system, including one or more central processing units for performing data processing steps as described herein, storage devices and databases for storing account and portfolio information as described herein, and communications interfaces for enabling communication between the investment system, the at least one investor 101 using the portfolio management tool 200, the financial markets, and information resources. For example, the invention can be implemented using an Internet-based communication system or any other viable data communication system, as shown in FIGS. 9 and 10.

Portfolio construction with the portfolio management tool 200 as illustrated in FIGS. 2-6, can be characterized by using Dynamically Linked and Re-configurable Portfolio Building Blocks (DLRPBBs) 100. The DLRPBBs 100 offer the Investor 101 customizable graphical portfolio construction and management capabilities by providing direct portfolio relationship linkages to other DLRPBB elements in the portfolio as well as linkages to the Investment Management System 300 and the plurality of portfolio management features made available to the Investor 101. Investor customized DLRPBBs 100 can facilitate many GUI driven portfolio development and management functions, including:

access to customizable portfolio management tools and/or information resources;

automatic generation of portfolio account relationships between the building blocks when connected together through dynamic links in a multi-tiered portfolio structure;

cascaded information and management actions up and/or down the hierarchical structure in a multi-tiered portfolio to consolidate information and to provide flexibility and simplification to investment activities;

access to dedicated information services such as news items, research information and analyses;

access to historical portfolio activities;

access to portfolio analysis tools such as charting, performance and comparison services; and access to any other related service or information resource that is deemed by the investor to be relevant to the investment portfolio and which is supported by the overall investment management system 300.

In FIGS. 2-6, the DLRPBBs 100 are assigned as portfolio components and structured into a visual representation of the portfolio within the Portfolio Construction and Management Area 201 of the Investor's 101 Portfolio Management System 200. Each DLRPBB 100 is a visual representation of its assigned underlying constituents in the portfolio whether it represents the entire portfolio (first tier) 202, the subgroups (middle tiers) 203, or the individual portfolio investment (bottom tier) 204. In other words, the underlying constituent(s) of a DLRPBB 100 will either be an individual portfolio investment or the constituents of the tier that reside directly beneath it in the hierarchical portfolio structure. The visual construction of the DLRPBBs 100 directly correlates to the actual customized fund the Investor 101 is interested in establishing. The DLRPBBs 100 can then be modified and managed in such a way by the Investor 101 that the overall portfolio is always visually intuitive and information rich.

Figure 7A:
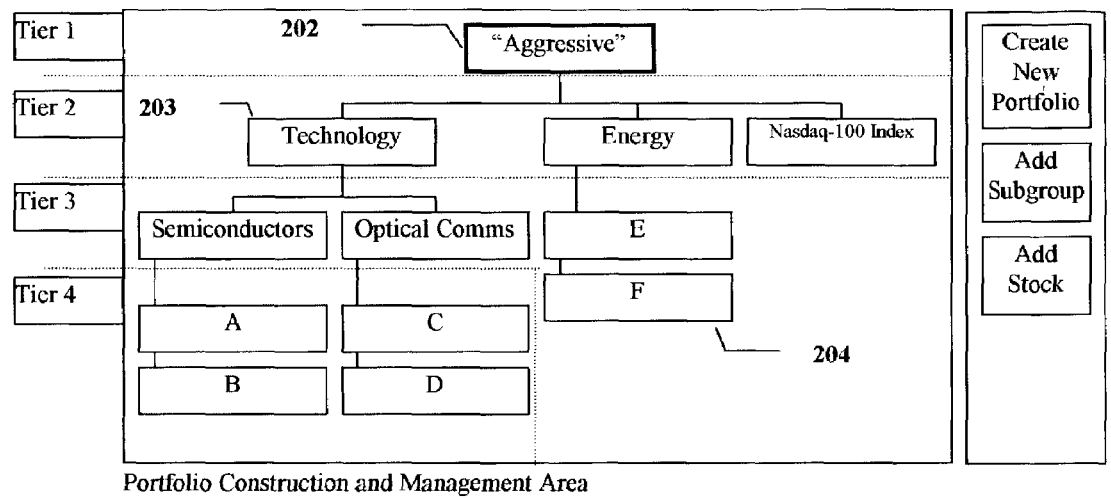
FIG. 7a and FIG. 7b depict the completed portfolio started in FIGS. 2-6. The portfolio is visually represented by dynamically linked and re-configurable portfolio building blocks.
Figure 7B:
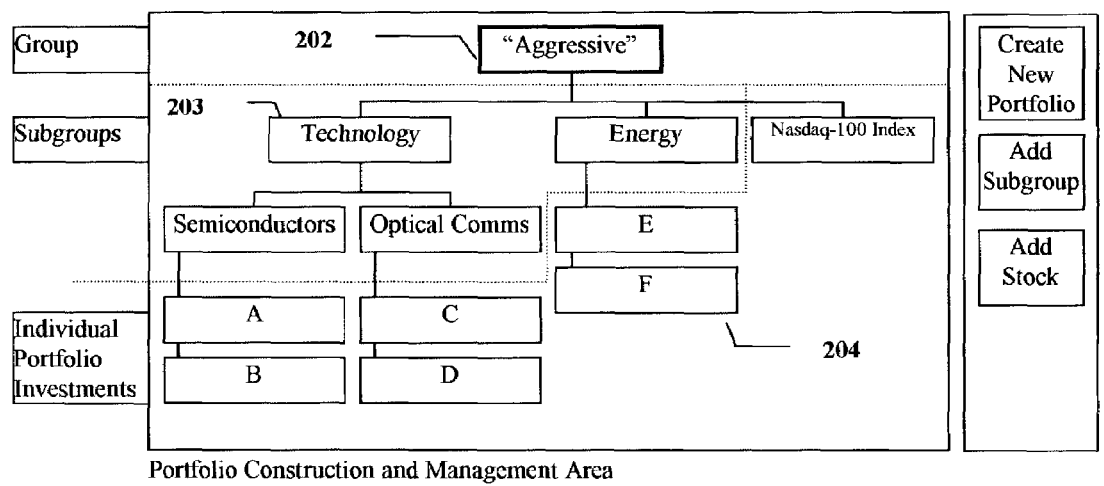

The DLRPBBs 100 offer the Investor 101 a variety of portfolio construction and management tools as well as information resources that are useful to the Investor 101 and directly applicable to the positioning of the DLRPBB 100 within the portfolio. Through the use of the tools and resources, each DLRPBB 100 offers the Investor 101 a degree of customization whereby the Investor 101 can specify things such as automated portfolio activity requests or information display within the visual context of the DLRPBB 100 in the portfolio structure. The DLRPBB's 100 functionality is dependent upon its placement within the structure of the overall portfolio, as illustrated in FIG. 7b. In other words, the resources and toolsets available to a DLRPBB assigned as a subgroup 203 may differ from those available to the Investor 101 as those which are associated with a DLRPBB assigned as an individual portfolio investment 204.

Portfolio creation and management is simplified in many ways by the use of DLRPBBs 100. Among other things, these building blocks can be used to create and structure a portfolio, modify a portfolio, set various investment criteria and execute various investment orders and gain additional information about the portfolio or the individual constituent investments. The DLRPBBs 100 dynamically and automatically link themselves to one another through their customized placement and established links set up in the portfolio structure by the Investor 101. Through these links, pertinent information is transmitted up and down the hierarchical structure of the portfolio to ensure that the appropriate hierarchical functions are carried out within the multilevel investment structure.

Figure 8:
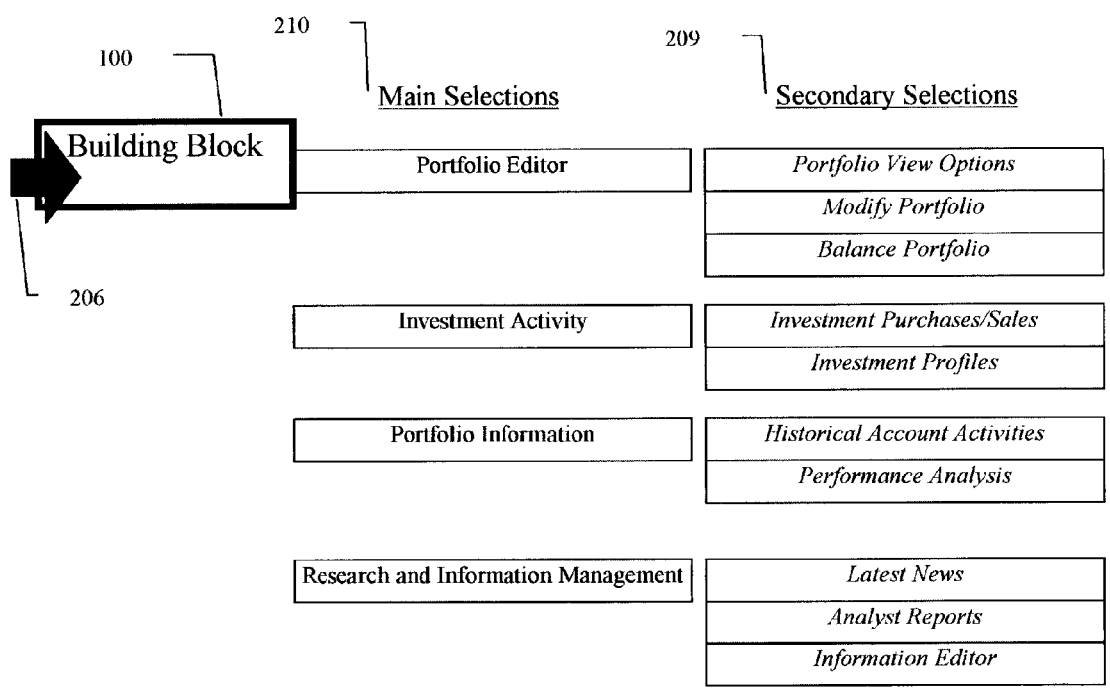
FIG. 8 illustrates some of the management and information tools and resources that may be available to the Investor from each building block in the portfolio management tool.

As illustrated in FIG. 9, the Investor 101 has the ability to enter differing modes of operation within the portfolio management tool 200 (i.e. investment allocation, portfolio management, portfolio analysis, etc.) and readily access information and/or manage portions of the portfolio from any of the building blocks that make up the portfolio (e.g. through the use of drop-down menus (as illustrated in FIG. 8) or other such mechanism). The ability to access information or manage the portfolio in this way allows the Investor 101 to view more relevant information within the structure of the portfolio or manage different portions of the portfolio in different ways. The communication interface from the Investor's 101 Client Based Portfolio Management System 200 in any of these modes then communicates the Investor's 101 request either directly to the investment management system 300 or third party administrator. The system administrator then executes the Investor's 101 request, delivers the appropriate information and/or updates the Investor's 101 records accordingly.

An Investor 101 can create and manage a portfolio with DLRPBBs 100 through a variety of graphical or text based representations so it should be noted that the Investor 101 operated user interface or graphical user interface (GUI) can function in any number of ways to facilitate the placement and usage of the DLRPBBs 100. A structured and automated approach could be used. An example of such a structured approach is illustrated in FIGS. 2-6.

Figure 1:
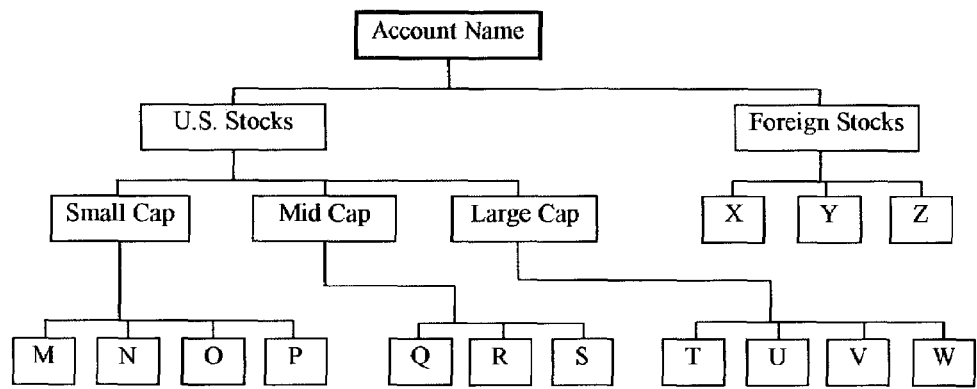
FIG. 1 illustrates a multi-tiered graphical portfolio.
Figure 2:
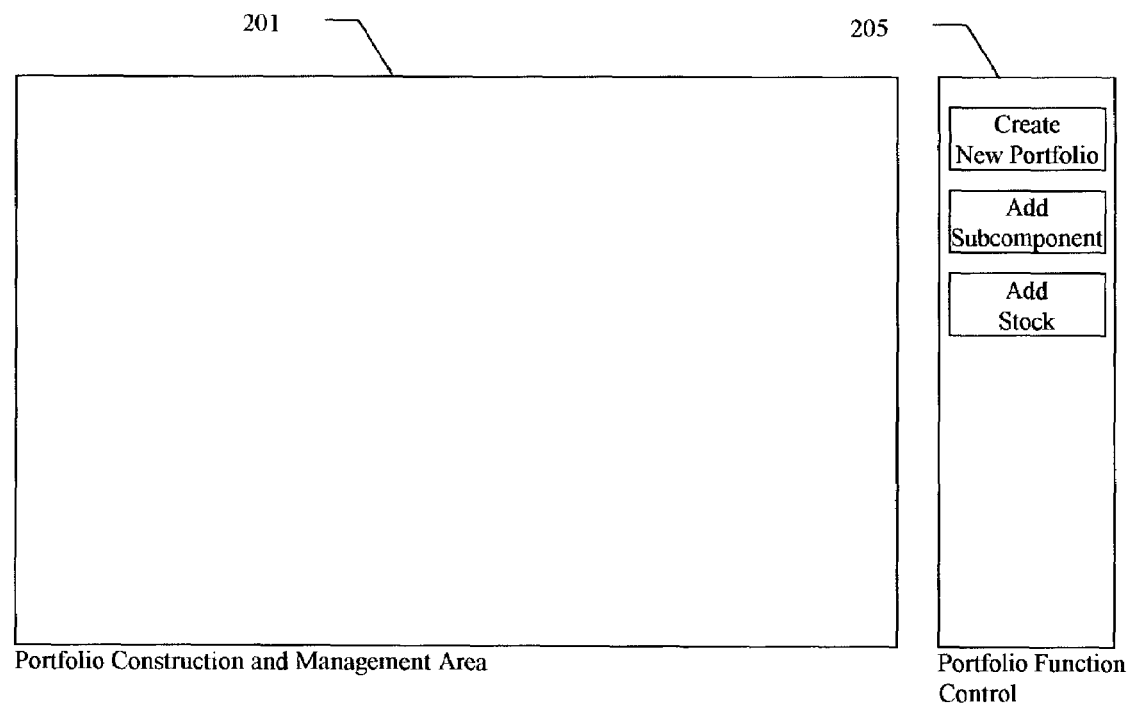
FIGS. 2-6 depict a visual sequence of one possible method for constructing a customized portfolio utilizing dynamically linked and re-configurable portfolio building blocks.
Figure 3:
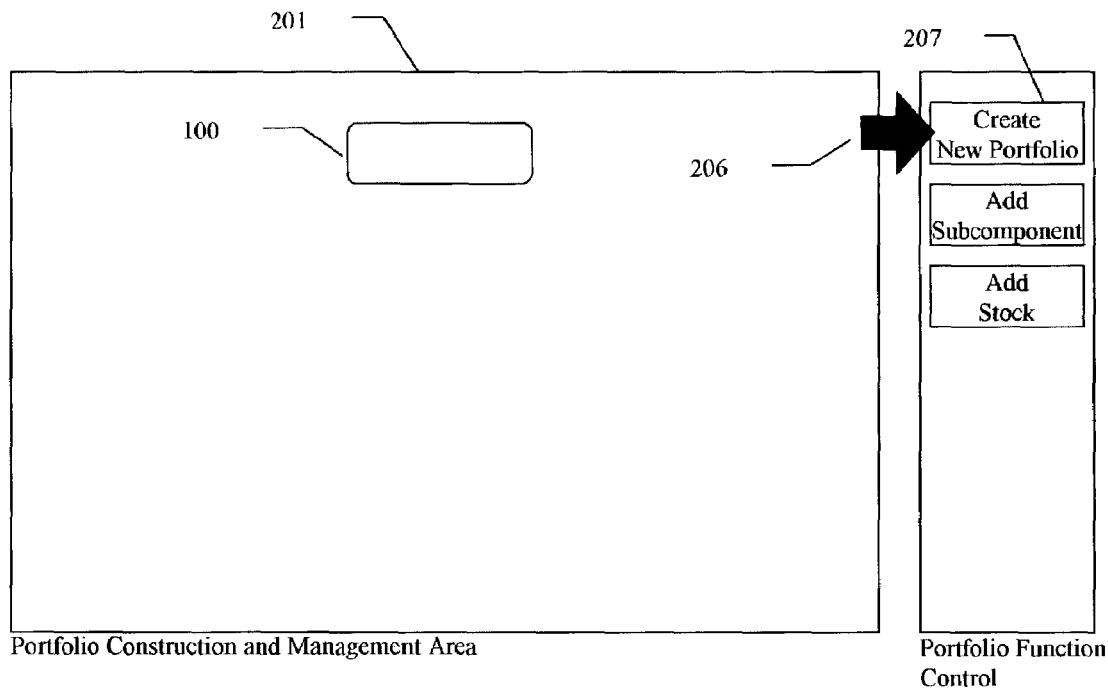
Figure 4:
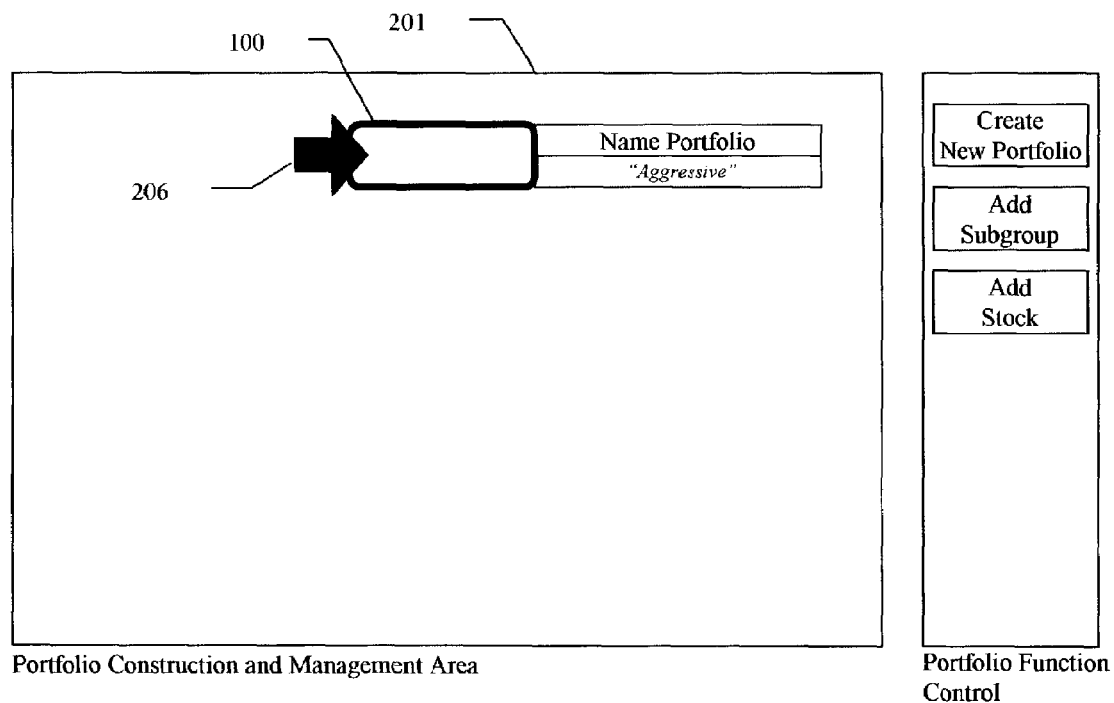
Figure 5:
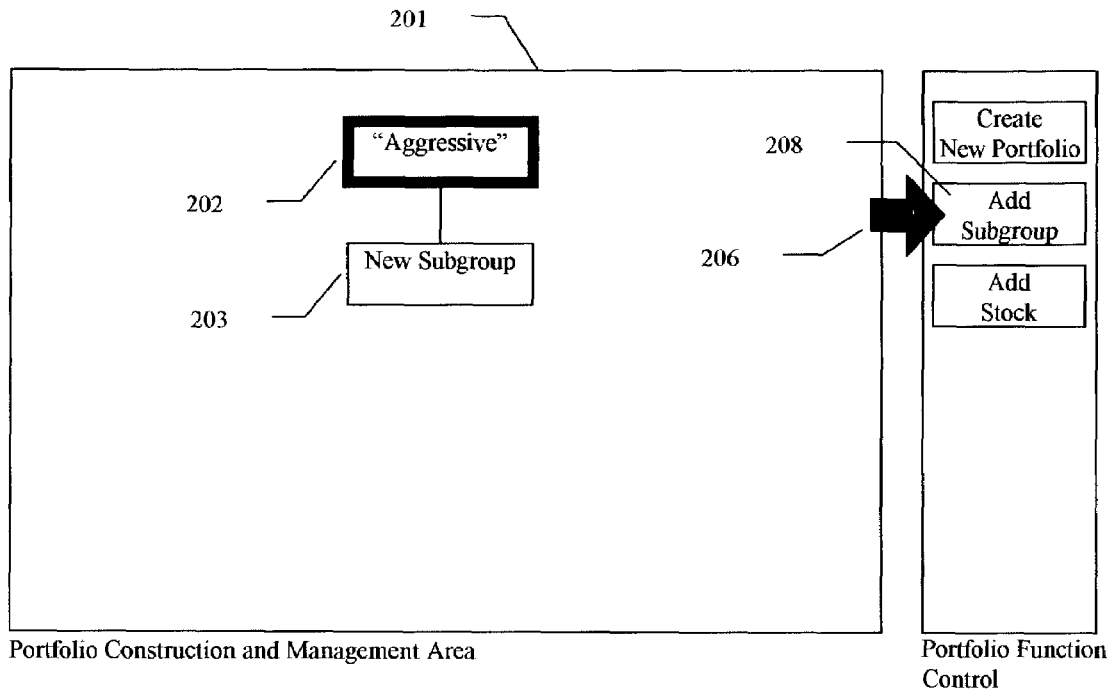
Figure 6:
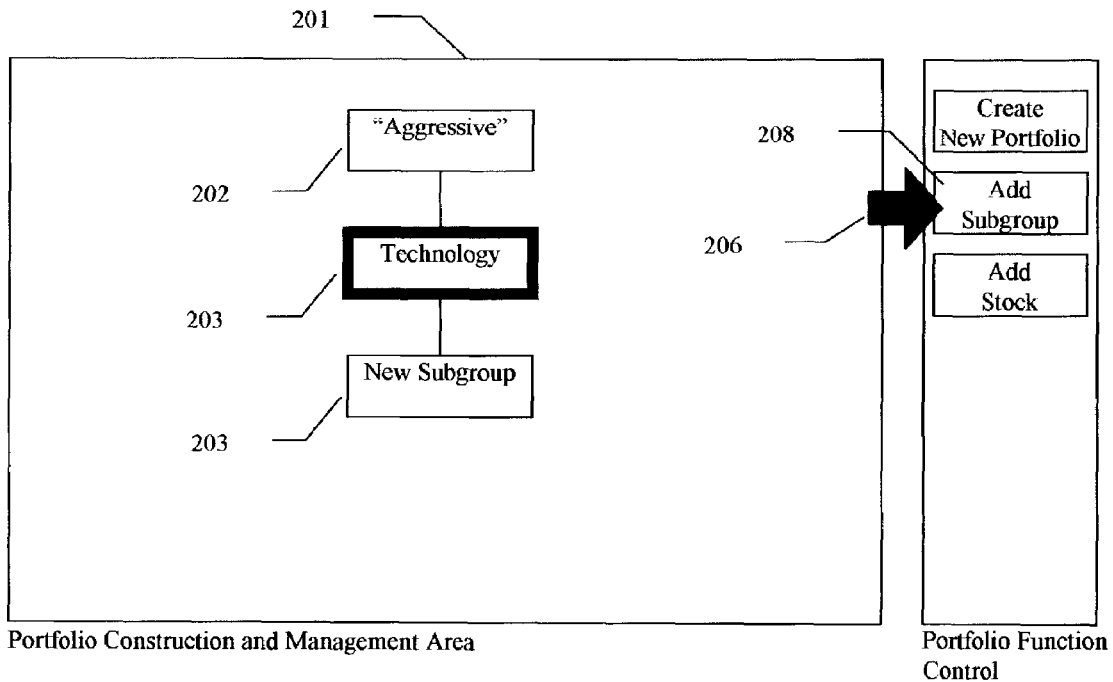

The following description of portfolio construction refers to FIGS. 2-6. An Investor 101 desiring to build a portfolio is presented with a GUI presenting a clear portfolio construction and management area 201 and a set of portfolio construction tools in the portfolio function control area 205 as in FIG. 2. In FIG. 3 the Investor 101 starts to build the portfolio by using the cursor 206 to select the Create New Portfolio button 207 and thereby generating the first DLRPBB 100 as the first visual representation of the portfolio. In FIG. 4, the Investor 101 has selected the portfolio DLRPBB 100 and from a drop down menu of various choices and chooses to apply a name to the DLRPBB 100. In FIG. 5, the Investor 101 has now used the cursor 206 to select the Add Subgroup button 208 thereby generating a subgroup DLRPBB 203 for the group DLRPBB 202. In FIG. 6, the Investor 101 has already named one subgroup DLRPBB 203 and is in the process of creating a third tier in the portfolio by generating a new subgroup DLRPBB 203 beneath the first. FIGS. 7a and 7b illustrate the end result of this portfolio construction process of FIGS. 2-6, which includes the selection of the individual portfolio investments 204 (investments A-F and the Nasdaq-100 Index).

To further describe the DLRPBB 100 portfolio relationships we refer to FIGS. 7a and 7b. The Technology subgroup 203 is connected at a level below the "Aggressive" portfolio block 202 to define it as a subcomponent of the "Aggressive" portfolio block 202. On the same multilevel tier and therefore an investment level peer of the Technology subgroup 203 is the Energy subgroup and the diversified Nasdaq-100 Index investment. The Semiconductor subgroup block is then defined in a similar way as a subcomponent to the Technology subgroup block 203 by connecting it at an even lower position in the hierarchy. The individual investments 204 find themselves at the bottom of any given hierarchical chain (in FIGS. 7a and 7b investment A is on the same tier as investment B but positioned vertically for illustration sake (the same holds true for investments C and D as well as for investments E and F). The connections made between the DLRPBBs 100 automatically set up the dynamic links between the building blocks 100 and all the portfolio account relationships that exist between them. In this manner, the DLRPBBs 100 provide an Investor 101 a simplified approach to portfolio management since any individually initiated or pre-programmed activity associated with any particular DLRPBB 100 is appropriately communicated and cascaded up and/or down the hierarchical DLRPBB 100 links and updated within the portfolio account and investment management system 300 accordingly.

Other highly flexible GUI portfolio construction techniques are certainly possible. One such method could be through a GUI that allows for a drag-and-drop DLRPBB 100 approach much like a typical drawing program or an organization chart developer on a computer. With this technique, the relationships between the DLRPBBs 100 at any level in the multilevel hierarchical structure (portfolio level 202, subgroup levels 203 and individual portfolio investments 204) can be defined by the Investor's 101 custom drawn building block connections.

Managing a portfolio made up of DLRPBBs 100 is a clear and straightforward process. As illustrated in FIGS. 8 and 9, each DLRPBB 100 utilized in portfolio construction may provide the Investor 101 with flexible access to a toolkit containing a variety of tools applicable to the individual DLRPBB's 100 specific position/identity in the portfolio structure and designed to assist the Investor 101 manage and keep informed of various aspects of the portfolios constituents.

From this toolkit the Investor 101 can customize a variety of specific account/portfolio related activities or requests such as scheduling various investment activities, or requesting certain pertinent pieces of information. These customized routines and functions may be independently developed for each DLRPBB 100, and, among other things, they may be set as recurring events (if desired) and saved and accessed for modification by the Investor 101 in the future.

Each DLRPBB 100 residing on any level in the multi-tiered portfolio may have the ability to allow the Investor 101 to perform a number of flexible portfolio management functions that are associated with its placement within the portfolio. These portfolio management and information choices can be made available after selecting the appropriate DLRPBB 100. These functions can comprise activities such as portfolio reallocation and restructuring, investment activities such as purchases, sales and limit order placements and manipulation as well as investment research and historical account information. Other account related activities could also be directly driven from this interactive account management system. A few examples from a pull down menu of choices for account management and information activities that can be initiated from the DLRPBBs 100 are illustrated in FIG. 8. The Investor 101 can be guided along the portfolio management and information choices with increasing levels of detail. This illustration depicts one level of finer detail 209 made available to the Investor 101 from an initial selection of four main choices 210. The finest level of detail would prompt the Investor 101 to select and specify a specific account management activity or investment management request.

The toolkit can provide access to both general and position/identity specific toolset functionality. For instance, by clicking on the Semiconductor subgroup DLRPBB 100 it is possible to obtain access to the general news functions as well as to those news stories that have been keyword searched for "Semiconductors" if pre-programmed by the Investor 101. It is also possible for the Investor 1O1 to independently program each DLRPBB 100 with a set of different instructions. Any instruction sets that appeared to cause potential problems can be highlighted to alert the Investor 101.

Each DLRPBB 100 can also be dynamically reconfigurable so that the Investor 101 can at will and within the bounds of the investment management system 300 change the properties, programmed settings, representative constituents, and portfolio position of the DLRPBB 100. For instance, a DLRPBB 100 representing an individual investment holding 204 could be selected from the portfolio by the Investor 101 and graphically dragged into a "Sell" window on a portfolio function control panel 205 and thereby prompting an investment activity tool from which the Investor 101 could select to sell all, some or none of the individual investment holding from the portfolio.

Each DLRPBB 100 may also have the capability of automatically, or by customized Investor 101 settings, delivering a visually coded message (color, shapes, etc.) that indicates a specific condition as it relates to the DLRPBBs 100 representation. Multiple conditions are possible here, but some simple illustrative examples may be a green DLRPBB 100 to represent an increase in an investments value (or collective constituents if the DLRPBB 100 represents a group 202 or subgroup 203) or red for a decrease in value.

Figure 11:
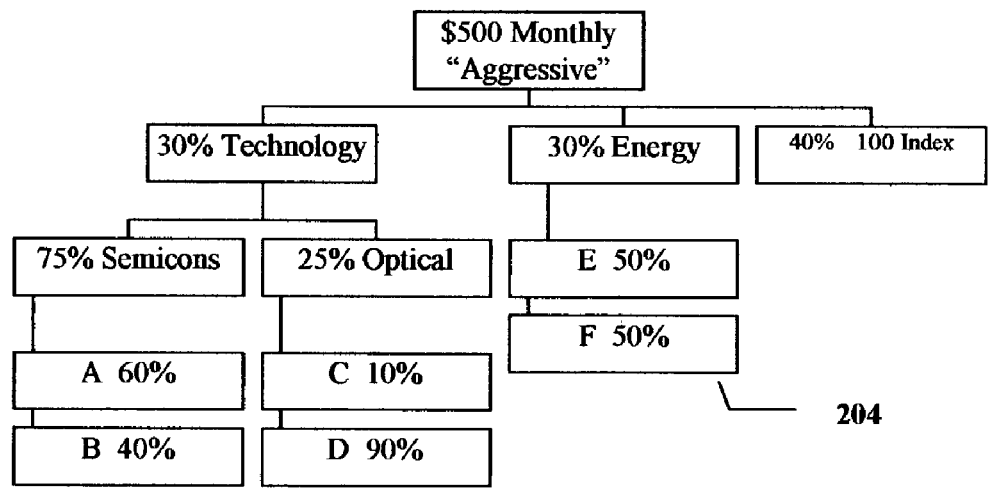
FIG. 11 depicts a sample portfolio building block investment profile representing the entire portfolio of FIGS. 6a and 6b.
Figure 12:
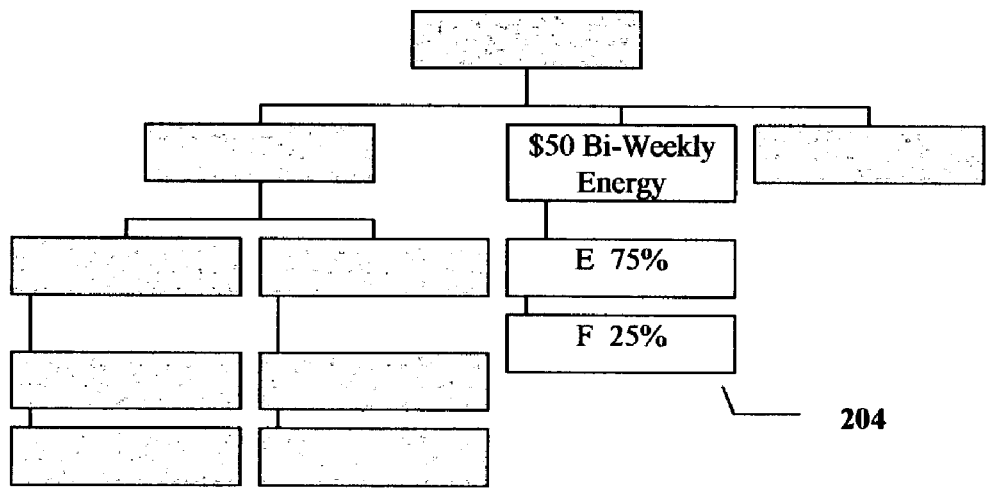
FIG. 12 illustrates a sample portfolio building block investment profile representing a subset of the entire portfolio of FIGS. 6a and 6b.

Investment management functions using DLRPBBs 100 are created and managed using an Investment Activity toolset. The Investment Activity toolset is accessible to the Investor 101 through the DLRPBBs 100 that make up the portfolio or through some other path in the investment management tool 200. Among other activities, the Investment Activity tool allows the Investor 101 to construct, manage and save one or more investment profiles (IPs). The IPs are DLRPBBs 100 operating in an investment allocation structural mode and are made up of one or more portfolio building blocks. They are designed to facilitate investment activities (purchases or sales) under an Investor's 101 customized choice of investment criteria. An IP can represent the entire portfolio, (as in FIG. 11), subsets of the entire portfolio (as in FIG. 12), or any combination of existing portfolio constituents and/or new constituents to an already existing portfolio. An Investor 101 could apply a primary IP to the portfolio and/or set up and save multiple IPs for pre-programmed and/or recurring investment events or just for future reference. IPs can be directly associated and linked to a DLRPBB 100 in the portfolio or they can be independently structured.

IPs provide a significant advantage for an Investor 101 managing a diversified portfolio account of equities by providing the Investor 101 the flexibility to construct, implement and save, various portfolio investment activities aside from the overall construction and primary allocation assignments of the portfolio. Multiple IPs are possible for any given account portfolio and each one can be operated independently under a number of Investor 101 defined investment criteria and parameters. For instance, an Investor 101 may set up two different IPs for the entire portfolio. While the first IP is programmed to reoccur monthly and to operate under one set of investment allocation settings, the second may be programmed to operate under a different set of allocation settings and where the investment activities are triggered by a certain set of market events.

IPs do not necessarily require the same structure of DLRPBBs 100 as the portfolio or initially even consist of its constituent investments. In other words, an IP may contain various investments that are new or already existing in the main portfolio and which are not necessarily grouped and structured in the same way they are in the main portfolio. However, all investment activities, once implemented, are recorded and structured into the operating portfolio to which they are associated either automatically or through the input assistance of the Investor 101. The Investor 101 has the option of structuring any newly introduced investment or group/subgroup(s) of investments anywhere in the existing portfolio structure.

Another advantage of multiple IPs allows the Investor 101 to independently manage different subsets of the portfolio in different ways. For example, from FIG. 11, one IP may contain the entire "Aggressive" portfolio and may dictate an automatic monthly investment of $500 according to a predetermined allocation arrangement. Another IP may contain the Energy subgroup alone and may be set up to automatically make an additional investment of $50 every two weeks according to a different predetermined allocation factor, as in FIG. 12. In addition, a new IP may be set up to introduce a new investment or group/subgroup(s) to the portfolio. Each IP can be set up temporarily for an individual investment activity or set up as a recurring investment event. In this way an Investor 101 can trade investments independently while at the same time designing complex portfolio management investment scenarios. Regardless of the intended purpose, each IP, as other DLRPBB 100 customizable functions, can be individually stored for future reference and modification.

The Investor's Portfolio Management System 200 and the overall Investment System 300 can offer a variety of features to assist the Investor 101 set up and manage the portfolio. For instance, two or more DLRPBBs 100 connected to the same higher-level DLRPBB 100 places them at the same subset investment level or peer group in the portfolio or IP. Therefore the investment allocation across them should equal 100% of the higher-level DLRPBB's 100 allocation in order to avoid a default allocation to cash or other investment instrument. Initially setting or changing one of these investment level peer's allocation factor may therefore activate the allocation assistance functions for Investor 101 clarity and decision making assistance. Allocation assistance could be made by visually indicating to the Investor 101 what percentage and/or total sum of the overall sub-tiered investment is left over for allocation. For instance, referring to FIG. 11, if the Investor 101 allocates 30% to the Technology subgroup, then the Investor 101 could be informed that 70% was still available for allocation. If the Investor 101 allocates a further 30% to the Energy subgroup then an indication of 40% of the initial allocation is still available for the remaining Nasdaq-100 Index Tracking Stock investment. An alert would occur if an over or an under allocation was considered. Where appropriate, allocation assistants could activate when the Investor 101 changed the allocation factor of any given portfolio component. If the Investor 101 initiated a change that affected a different level of the portfolio then that would be alerted as well. For instance if the Investor 101 made a change to an investment component that resulted in an investment amount that superseded an overall investment budget the Investor 101 previously set.

As the Investor 101 customizes the investment allocations in an IP of the portfolio structure the Investor 101 could work in percentages or monetary value. If an Investor 101 works in monetary values from a bottom-up approach then the total sum allocated to each group/subgroup would be calculated as each investment amount is allocated and the total investment calculation would be available at any given time to the Investor 101 during the allocation process. If on the other hand the Investor 101 worked in a top-down approach with monetary or percentage values then the Investor 101 would always be aware of the investment portion left for allocation in each subgroup or individual investment as the allocation process proceeds. Placing an order to purchase a certain dollar amount of a particular group or subgroup will initiate an order to purchase all the equity constituents below that group or subgroup in the hierarchical structure. If the Investor 101 has pre-programmed the diversification allocation of the group or subgroup and all of its equity constituents then the Investor 101 could have the option to execute the purchase order according to these conditions.

Referring again to FIG. 11, the $500 automatic monthly investment into the "Aggressive" portfolio allocated under this particular investment profile would distribute the following monies into the individual portfolio investments 204 according to the prescribed allocation factors: A ($67.50); B ($45); C ($3.75); D ($33.75); E ($75); F ($75) and the Nasdaq-100 Index ($200). The $50 automatic bi-weekly investment into the Energy Subgroup of the "Aggressive" portfolio, illustrated in FIG. 12, would be distributed the following way according to this investment profiles allocation factors: E ($37.50); and F ($12.50).

Another tool to provide organized clarity and customizable flexibility to an Investor's 101 visual and information rich portfolio accessible directly through the DLRPBBs 100 is the Research and Information Management Toolset. This toolset allows the Investor 101 to set up and manage the information that the Investor 101 wishes to see on a regular basis as well as allowing the Investor 101 to access information sources for personal research. These tools are accessible through the DLRPBBs 100 and can be customized by the Investor 101 to search information or filter information and deliver it to the Investor 101 on a continual basis, if desired, via numerous methods (i.e. e-mail, wireless alerts, computer screen, etc.). Information can be directly portfolio related (i.e. performance of the portfolio or subset of portfolio, i.e. individual equity alert, etc.) or any other type of information made available by the system that may be of interest to the Investor 101 (i.e. news stories, press releases, etc.). Each customized set of information requested by the Investor 101 can be individually saved as an Information Profile associated with a DLRPBB 100 and accessed by the Investor 101 at a future point for modification. An example of how an Investor 101 may customize an Information Profile under the sample portfolio of FIG. 7b may be that each of the subgroups could be set up to filter daily news releases in accordance with keywords associated with their title i.e. Semiconductor, Optical Communications and Energy. The Investor 101 may then view these daily information feeds within the appropriate DLRPBB's information center. Lower tier DLRPBB's 100 information could also be viewed at any higher level as well, i.e. Investment A's specific information could be viewed under the Investment A DLRPBB or under the Semiconductor subgroup DLRPBB and so on up the chain. In this manner, the Investor 101 can have ready access to specific information pertaining to one component of the portfolio or take advantage of structured organization and view a broader base of information that pertains to any portion of the of the portfolio in the hierarchical chain.

As evidenced by the foregoing description, the present invention offers a simple yet powerful investment management tool that enables investors to create and manage a visual, information rich portfolio in a manner previously unavailable. It will be apparent to those skilled in the art that various modifications and variations can be made in the investment management tool of the present invention without departing from the spirit or scope of the invention. Thus, it is intended that the present invention covers the modifications and variations of this invention provided they come within the scope of the appended claims and their equivalents.

What is claimed is:

1. An investment portfolio development and management system for a plurality of individual investors to visually develop and manage customized, graphical, hierarchical, multi-tiered portfolios in their at least one account, the system further enabling the plurality of investors to selectively buy and sell interests in each of at least one of a plurality of different individual securities and security-based investment instruments traded on at least one financial market, the system including:

(a) a programmed computerized data processing system, including one or more central processing units for performing processing steps associated with investment portfolio development and management;

(b) storage devices and databases for storing account and portfolio information;

(c) communications interfaces for enabling communication between the computerized data processing system, the financial markets, information resources and investor computers;

(d) a graphical user interface (GUI) executing on at least one of said investor computers and in communication with the programmed computerized data processing system, the GUI comprising graphic, structural portfolio building blocks changeably configured, positioned and programmed by the investor, whereby each building block actively participating in the hierarchical portfolio;

(i) graphically represents a constituency of either an individual security, a security-based investment instrument, or the building block components directly linked to it on the underlying tier in the portfolio;

(ii) virtually links to graphically associated building blocks within the portfolio structure;

(iii) automatically generates portfolio account relationships between the graphically associated building blocks enabling two-way information flow both up and down the hierarchical structure to facilitate structured portfolio management functionality and information transfer consistent with the portfolio's structural design;

(iv) visually displays constituency related account information;

(v) providing access to constituency relevant management tools; and (vi) providing access to visual configuring and information displaying functions;

(e) investment management toolsets stored on said storage devices and accessible on investor computers in communication with the programmed computerized data processing system via the communications interfaces, the toolsets providing building block specific portfolio management functions relevant to a building block's one or more constituents, including those for receiving and processing the investor's: (i) purchase orders; (ii) sell orders; (iii) limit orders; (iv) asset allocation instructions; and (v) programming instructions to changeably customize, at least one of scheduling and automating these portfolio management functions, and;

(f) information resource management toolsets stored on said storage devices and accessible on investor computers in communication with the programmed computerized data processing system via the communications interfaces, the toolsets providing building block specific information resources relevant to a building block's one or more constituents and functions for receiving and processing programming instructions for changeably customized information delivery.

2. The investment portfolio development and management system of claim 1 wherein the said system further includes data and processing mechanisms for investors to selectively buy and sell interests in fractionalized market units of an individual security.

3. The investment portfolio development and management system of claim 1 wherein at least one portfolio building block provides the investor with access to a plurality of automated portfolio management and information resource tools providing customizing, programming, and modification functions.

4. The investment portfolio development and management system of claim 1 wherein said graphical user interface further provides programming functionality for the building block's one or more constituents relating to, at least one of, automated alerts, and information resource presentation.

5. The investment portfolio development and management system of claim 1 said system further providing hierarchical portfolio limit order functionality wherein a limit order applied to a building block applies to the one or more building block constituents and further corresponds to any investor applied asset allocation factor assigned to those constituents.

6. The investment portfolio development and management system of claim 1 wherein the GUI utilizes drag-and-drop functions.

7. The investment portfolio development and management system of claim 6 wherein said portfolio building blocks changeably positioned within the hierarchical portfolio structure automatically establish relevant account linkages and associations.

8. The investment portfolio development and management system of claim 1 further supplying the investor with at least one toolset function as a result of, at least one of, the investor assigned position, and the investor assigned identity of a building block.

9. The investment portfolio development and management system of claim 1 said information resource management toolsets further supplying information and customizing functions relevant to a building block's one or more constituents that relates to at least one of; (i) news items, (ii) third party research, (iii) research and analysis tools, (iv) historical portfolio activities, (v) charting, and (vi) investment performance comparisons.

10. The investment portfolio development and management system of claim 1 wherein said system further contains customizing functions for information resource delivery, including those for key word searching.

11. The investment portfolio development and management system of claim 1 wherein said GUI further contains customizing functions for the information display within the visual context of the portfolio building block.

12. The investment portfolio development and management system of claim 1 wherein said GUI automatically alerts the investor to any customizing or programming function that appears problematic.

13. The investment portfolio development and management system of claim 12 wherein said alternate portfolio building block relationships apply to at least one of the entire main portfolio building block structure, a subset of the main portfolio building block structure, and any structural combination of existing portfolio constituents and newly introducing portfolio constituents.

14. The investment portfolio development and management system of claim 1 wherein said system supporting alternate portfolio building block relationships within an account in addition to the main portfolio structure and building block relationships.

15. An investment portfolio development and management system for a plurality of individual investors to visually develop and manage customized, graphical, hierarchical, multi-tiered portfolios in their at least one account, the system further enabling the plurality of investors to selectively buy and sell fractionalized market unit interests in each of at least one of a plurality of different individual securities and security-based investment instruments traded on at least one financial market, the system including:

(a) a programmed computerized data processing system, including one or more central processing units for performing processing steps associated with investment portfolio development and management;

(b) storage devices and databases for storing account and portfolio information;

(c) communications interfaces for enabling communication between the computerized data processing system, the financial markets, information resources and investor computers;

(d) a graphical user interface (GUI) executing on at least one of said investor computers and in communication with the programmed computerized data processing system, the GUI comprising graphic, structural portfolio building blocks changeably configured, positioned and programmed by the investor, whereby each building block actively participating in the hierarchical portfolio;

(i) graphically represents a constituency of either an individual security, a security-based investment instrument, or the building block components directly linked to it on the underlying tier in the portfolio;

(ii) virtually links to graphically associated building blocks within the portfolio structure;

(iii) automatically generates portfolio account relationships between the graphically associated building blocks enabling two-way information flow both up and down the hierarchical structure to facilitate two-way information flow so that portfolio management functionality and information transfer remains consistent with the portfolio's visually structured design;

(iv) visually displays constituency related account information;

(v) providing access to constituency relevant management tools; and (vi) providing access to visual configuring and information displaying functions;

(e) investment management toolsets stored on said storage devices and accessible on investor computers in communication with the programmed computerized data processing system via the communications interfaces, the toolsets providing building block specific portfolio management functions relevant to a building block's one or more constituents, including those for receiving and processing the investor's: (i) purchase orders; (ii) sell orders; (iii) limit orders; (iv) asset allocation instructions; and (v) programming instructions to changeably customize, at least one of, scheduling and automating these portfolio management functions, and;

(f) information resource management toolsets stored on said storage devices and accessible on investor computers in communication with the programmed computerized data processing system via the communications interfaces, the toolsets providing building block specific information resources relevant to a building block's one or more constituents and functions for receiving and processing programming instructions for changeably customized information delivery.

16. The investment portfolio development and management system of claim 15 wherein said graphical user interface further provides programming functionality for the building block's one or more constituents relating to, at least one of, automated alerts, and information resource presentation.

17. The investment portfolio development and management system of claim 15 said system further providing hierarchical portfolio limit order functionality wherein a limit order applied to a building block applies to the one or more building block constituents and further corresponds to any investor applied asset allocation factor assigned to those constituents.

18. The investment portfolio development and management system of claim 15 wherein the GUI utilizes drag-and-drop functions.

19. The investment portfolio development and management system of claim 15 further supplying the investor with at least one toolset function as a result of, at least one of, the investor assigned position, and the investor assigned identity of a building block.

20. An investment portfolio development and management system for a plurality of individual investors to visually develop and manage customized, graphical, hierarchical, multi-tiered portfolios in their at least one account, the system further enabling the plurality of investors to selectively buy and sell fractionalized market unit interests in each of at least one of a plurality of different individual securities and security-based investment instruments traded on at least one financial market, the system including:

(a) a programmed computerized data processing system, including one or more central processing units for performing processing steps associated with investment portfolio development and management;

(b) storage devices and databases fin storing account and portfolio information;

(c) communications interfaces for enabling communication between the computerized data processing system, the financial markets, information resources and investor computers;

(d) a graphical user interface (GUI) executing on at least one of said investor computers and in communication with the programmed computerized data processing system, the GUI comprising graphic, structural portfolio building blocks changeably configured, positioned and programmed by the investor, whereby each building block actively participating in the hierarchical portfolio:

(i) graphically represents a constituency of either an individual security, a security-based investment instrument, or the building block components directly linked to it on the underlying tier in the portfolio;

(ii) virtually links to graphically associated building blocks within the portfolio structure;

(iii) automatically generates portfolio account relationships between the graphically associated building blocks enabling two-way information flow both up and down the hierarchical structure to facilitate two-way information flow so that portfolio management functionality and information transfer remains consistent with the portfolio's visually structured design;

(iv) visually displays constituency related account information;

(v) providing access to constituency relevant management tools; and (vi) providing access to visual configuring and information displaying functions;

(e) investment management toolsets stored on said storage devices and accessible on investor computers in communication with the programmed computerized data processing system via the communications interfaces, the toolsets providing building block specific portfolio management functions relevant to a building block's one or more constituents, including those for receiving and processing the investor's: (i) purchase orders; (ii) sell orders; (iii) limit orders wherein a limit order applied to a building block applies to the one or more building block constituents and further corresponds to any investor applied asset allocation factor assigned to those constituents; (iv) asset allocation instructions; and (v) programming instructions to changeably customize, at least one of scheduling and automating these portfolio management functions, and;

(f) information resource management toolsets stored on said storage devices and accessible on investor computers in communication with the programmed computerized data processing system via the communications interfaces, the toolsets providing building block specific information resources relevant to a building block's one or more constituents and functions for receiving and processing programming instructions for changeably customized information delivery.

\* \* \* \* \*